(No Model.)

E. & L. HEDDERICH.
SAWING MACHINE.

No. 525,544. Patented Sept. 4, 1894.

Witnesses
Jas. K. McCutchan
D. T. Walkauf

Inventors
Edward Hedderich
Leander Hedderich
By their Attorneys.
C. A. Snow & Co.

UNITED STATES PATENT OFFICE.

EDWARD HEDDERICK AND LEANDER HEDDERICK, OF PETTIT, INDIANA.

SAWING-MACHINE.

SPECIFICATION forming part of Letters Patent No. 525,544, dated September 4, 1894.

Application filed November 15, 1893. Serial No. 491,010. (No model.)

*To all whom it may concern:*

Be it known that we, EDWARD HEDDERICK and LEANDER HEDDERICK, citizens of the United States, residing at Pettit, in the county of Tippecanoe and State of Indiana, have invented a new and useful Sawing-Machine, of which the following is a specification.

This invention relates to sawing machines; and it has for its object to provide certain improvements in that class of sawing machines employed for cutting timber in short lengths, as for stove wood, shingle blocks, paving blocks, &c.

To this end the main and primary object of the present invention is to construct a sawing machine with a swinging saw combined with several features which render the same very effective in the work required of it.

With these and other objects in view which will readily appear as the nature of the invention is better understood, the same consists in the novel construction, combination and arrangement of parts hereinafter more fully described, illustrated and claimed.

Figure 1:
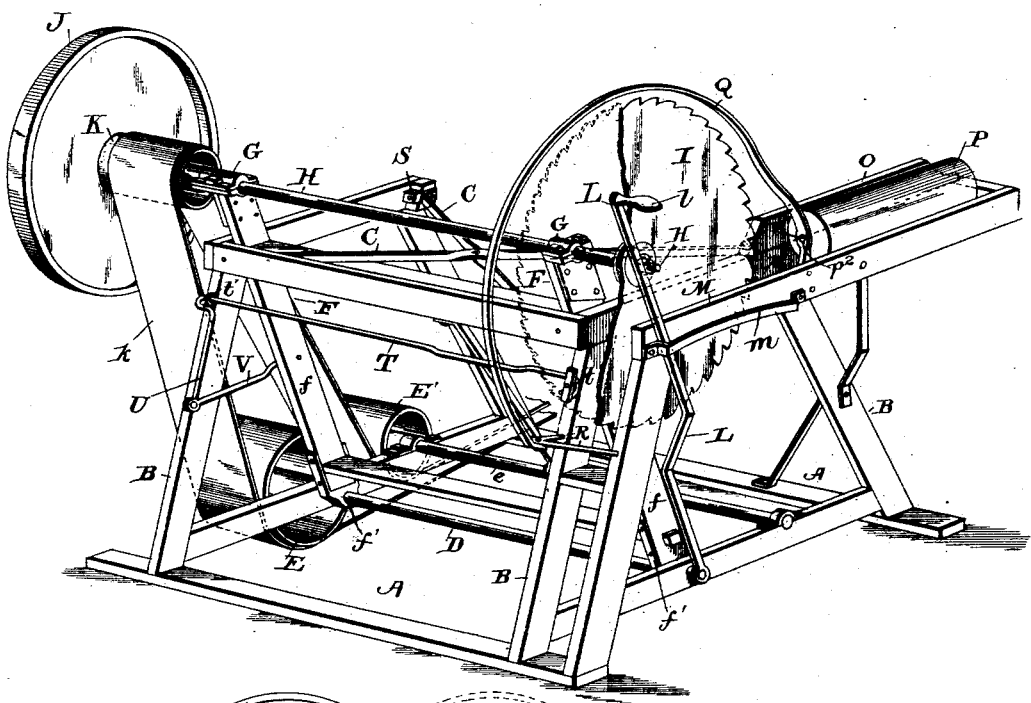
Figure 2:
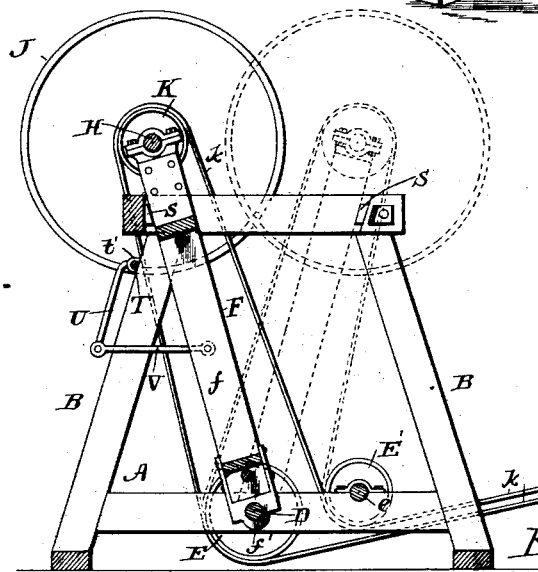
Figure 3:
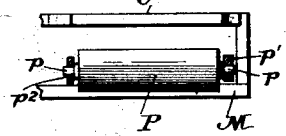

In the accompanying drawings:—Figure 1 is a perspective view of a sawing machine constructed in accordance with this invention. Fig. 2 is a central vertical longitudinal sectional view of the machine. Fig. 3 is a detail view showing the bearings of the table roller.

Referring to the accompanying drawings, A represents the base frame of the machine, from which arise the opposite side frames B, suitably braced together at their upper ends by the intermediate crossed bracing bars or rods C, which serve to give strength and rigidity to the frame, but said frame may be constructed and braced in any other suitable manner whereby the same will be adapted for the several working parts of the machine.

Mounted centrally at the bottom of the machine frame is the central oscillating shaft D, which shaft has mounted loosely on one projected end thereof the tension pulley E, to be hereinafter referred to, and securely mounted on the shaft D, between the opposite frame sides B, is the swinging saw frame F. The swinging saw frame F, comprises the opposite connected frame arms $f$ which are clamped at their lower ends in the shaft stirrups $f'$, secured fast on the shaft D, while the upper ends of said frame arms $f$, carry the bearing boxes G, in which is journaled the transverse saw mandrel H. The transverse saw mandrel H, has attached to one end thereof at one side of one frame side B, an ordinary circular saw I, of that character which is ordinarily employed for cutting timber into short lengths, and on the opposite end of the mandrel H, at the opposite side of the frame is mounted a balance wheel J, and an adjacent drive pulley K, over which passes the drive belt $k$, one portion of which passes around and under the tension pulley E, and the other portion of which passes around and under a similar adjacent pulley E', suitably mounted on one end of a shaft $e$, mounted on the base frame A, adjacent to the shaft D. Now by reason of the disposition of the two tension pulleys E and E', it will be apparent that the swinging saw frame F, may be moved in either direction toward either end of the frame without affecting the tension of the drive belt K, and thereby providing means for always positively rotating the saw mandrel H. The shaft D, has securely attached to one end thereof, opposite the pulley E, the lower end of the hand feed lever L, which is arranged to work at one side of the guide bar M, and inside of the off-standing keeper plate $m$, attached to the outside of said guide bar, and of a length which limits the movement of the hand feed lever, which lever is provided at its upper end with a handle $l$, and is adapted to be grasped in order to move the saw onto the work.

The guide bar M, is suitably arranged at one upper side of the machine frame parallel with one of the upper side bars thereof, in order to form together with the frame a side guide slot N, which accommodates the swinging movement of the saw carried by the swinging saw frame, and at the forward upper end of the guide slot is arranged a raised table portion O, on which the work to be cut is placed, and parallel with and completing the table portion of the sawing machine is mounted the horizontal table roller P. The horizontal table roller P, is mounted directly over the forward end of the guide bar M, and is provided with the end spindles $p$, one of which is journaled in the end bearing plate $p'$, and the other of which is journaled in the bearing opening $p^2$, formed in the forward extremity of the circular guard strip Q.

The circular guard strip Q, is suitably secured at its front end to an intermediate point of the guide bar M, adjacent to one end of the roller P, and is curved rearwardly around and above one rear upper corner of the machine frame, so as to be attached at its rear or outer extremity to the apex of the offstanding V-shaped bracket arm R, fastened to one end of the frame. The circular guard strip Q, is curved on a circle of a diameter slightly greater than the diameter of the saw, and when the saw is in its normal position, swung back away from the front feed table of the machine, the said guard strip fully protects the operator from the turning saw. In operation the material to be sawed is simply placed on the front feed table of the machine, and the saw moved onto the material by grasping the hand feed lever L, and moving it in one direction.

The swinging saw frame when moved to the limit of its movement, at each end of the frame, is adapted to strike against the opposite pairs of buffer blocks S, suitably arranged at the upper opposite ends of the frame to protect the contacting parts of the machine, and after the sawing operation is completed the swinging frame is moved away from the saw table so as to bring the saw within the circle of the saw guard, by means of the spring wire shaft T. The torsional spring wire shaft T, is arranged at one end of the machine frame and is secured fast at one end as at $t$, leaving the other end free to turn in the bearing eye $t'$, and such free end of said shaft is provided with an angularly disposed arm U, to which is pivotally connected one end of the connecting arm V, the other end of which is pivotally attached to one side of the saw frame. When the saw frame is moved in one direction to bring the saw onto the material, the shaft T, is twisted so as to give it sufficient tension to normally return the saw to its proper inactive position when the hand lever is released, and thus prevent the saw frame from yielding to the tendency of gravity to fall to either side of the perpendicular center when the hand is taken from the hand lever.

Changes in the form, proportion and the minor details of construction may be resorted to without departing from the principle or sacrificing any of the advantages of this invention, and at this point it may be well to further direct attention to the two tension pulleys E and E'. It will be noted that these tension pulleys are arranged side by side in close proximity to each other and in substantially the same horizontal plane, so that by receiving separate portions of the single drive belt leading from the power wheel to the saw mandrel, the same tension is maintained in said belt at all positions of the swinging saw frame, thus insuring a positive operation.

Having thus described the invention, what is claimed, and desired to be secured by Letters Patent, is—

1. In a sawing machine, the combination of the machine frame having an upper side guide slot, and an end table portion at the front end of said guide slot, a saw guard arranged at one side of the machine frame and extending up to the inner end of said table portion, and a swinging saw frame carrying a circular saw moving in said guide slot and at one side of said saw guard, substantially as set forth.

2. In a sawing machine, the combination of the machine frame having an upper side guide slot, and an end table portion at the front end of said guide slot, a saw guard arranged at one side of and over the guide slot and extending up to the inner end of said table portion, one end of said saw guard being provided with a bearing opening, an end bearing plate located at a point opposite the bearing opening in the saw guard, a horizontal table roller arranged at the table portion of the machine frame and having its spindles journaled in said bearings, a swinging saw frame carrying a saw moving in said guide slot and at one side of the saw guard, and means for normally returning the saw to a position at one side of said saw guard, substantially as set forth.

3. In a sawing machine, the combination with the frame having a feed table at one end; of a swinging saw frame carrying a circular saw, and a circular guard strip mounted at one side of the machine frame in a line with the feed table thereof and the diameter of the curve of which is greater than the diameter of the saw, and means for normally returning the saw to a position at one side of said guard strip, substantially as set forth.

In testimony that we claim the foregoing as our own we have hereto affixed our signatures in the presence of two witnesses.

EDWARD HEDDERICK.
LEANDER HEDDERICK.

Witnesses:
WALTER M. RAMSEY,
WILL BLODGETT.